US011683722B2

(12) United States Patent
El Ferkouss et al.

(10) Patent No.: US 11,683,722 B2
(45) Date of Patent: Jun. 20, 2023

(54) FINE TIMING MEASUREMENTS IN ENTERPRISE DEPLOYMENTS USING HIGH BANDWIDTH CHANNELS

(71) Applicant: Hewlett Packard Enterprise Development LP, Houston, TX (US)

(72) Inventors: Omar El Ferkouss, St. Laurent (CA); Andre Beaudin, Montreal (CA); Sachin Ganu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 65 days.

(21) Appl. No.: 17/229,954

(22) Filed: Apr. 14, 2021

(65) Prior Publication Data
US 2022/0338060 A1 Oct. 20, 2022

(51) Int. Cl.
*H04W 64/00* (2009.01)
*H04W 28/082* (2023.01)
*H04W 28/02* (2009.01)
*H04W 84/12* (2009.01)

(52) U.S. Cl.
CPC ..... *H04W 28/085* (2013.01); *H04W 28/0268* (2013.01); *H04W 64/00* (2013.01); *H04W 84/12* (2013.01)

(58) Field of Classification Search
CPC .................................................. H04W 28/085
USPC ....... 370/338, 280, 401, 230, 232, 222, 391, 370/253, 252, 210, 345, 331, 328, 335, 370/329, 312, 341
See application file for complete search history.

(56) References Cited

U.S. PATENT DOCUMENTS

| 8,849,213 | B2 * | 9/2014 | Jones | H04B 17/318 |
| | | | | 455/67.11 |
| 9,906,916 | B2 | 2/2018 | Steiner | |
| 10,863,570 | B2 * | 12/2020 | Cirik | H04W 76/19 |
| 2016/0088497 | A1 * | 3/2016 | Segev | H04W 24/02 |
| | | | | 370/252 |
| 2016/0183171 | A1 * | 6/2016 | Hareuveni | H04W 64/00 |
| | | | | 370/328 |
| 2019/0246349 | A1 | 8/2019 | Xing | |
| 2019/0271774 | A1 | 9/2019 | Zhang et al. | |
| 2020/0068520 | A1 | 2/2020 | Marri Sridhar et al. | |

(Continued)

OTHER PUBLICATIONS

Ibrahim, M. et. al., Accuracy Evaluation of WiFi Fine Time Measurements on an Open Platform, (Research Paper), MobiCom, Oct. 29-Nov. 2, 2018, 11 Pgs.

(Continued)

*Primary Examiner* — Joseph Arevalo
(74) *Attorney, Agent, or Firm* — Hewlett Packard Enterprise Patent Department

(57) ABSTRACT

Examples of techniques for handling fine time measurement ranging requests are described. In an example, an access point (AP) may receive a ranging request for initiating a Fine Timing Measurement (FTM) session. The AP may modify a channel width of a Wireless Local Area Network (WLAN) channel on which the AP is operating from a first channel width to a second channel width for performing the FTM session, where the second channel width is greater than the first channel width. In response to completion of an FTM burst associated with the FTM session, the AP may restore the channel width of the WLAN channel to the first channel width for performing non-FTM operations of the AP.

19 Claims, 5 Drawing Sheets

(56) References Cited

U.S. PATENT DOCUMENTS

2020/0373970 A1* 11/2020 Ma .................... G06F 7/5446
2020/0404620 A1* 12/2020 Sang .................... H04W 68/06

OTHER PUBLICATIONS

Horn, B.K, "Doubling the Accuracy of Indoor Positioning: Frequency Diversity", epartment of Electrical Engineering and Computer Science, Mar. 9, 2020, 21 pages.

* cited by examiner

FINE TIMING MEASUREMENTS IN ENTERPRISE DEPLOYMENTS USING HIGH BANDWIDTH CHANNELS

BACKGROUND

A computer network includes a variety of network devices, such as access points, controllers, gateways, switches, etc., which perform different networking operations, such as network access, authentication, and routing network traffic to provide connectivity. A Wireless Local Area Network (WLAN) may include a plurality of Access Points (APs), as elements of the WLAN. These APs may be deployed in a network.

Client devices, such as laptops, personal computers, smartphones, etc. connect to network devices to exchange data with the network. Various positioning techniques can be employed for determining the position/location of a wireless communication device (e.g., a wireless local area network (WLAN) device) based on receiving wireless communication signals. For example, positioning techniques can utilize one or more Fine Timing Measurement (FTM) sessions between a client device and one or more access points. FTM-based positioning techniques may utilize one or more message exchanges to determine time of arrival (TOA), the round-trip time (RTT), or the time difference of arrival (TDOA) of the wireless communication signals. The RTT, TOA, and TDOA information may be used to determine the position of a wireless communication device in a wireless communication network. These factors may be used in conjunction with the known positions of one or more stations in the wireless network to derive the location of the wireless communication device.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
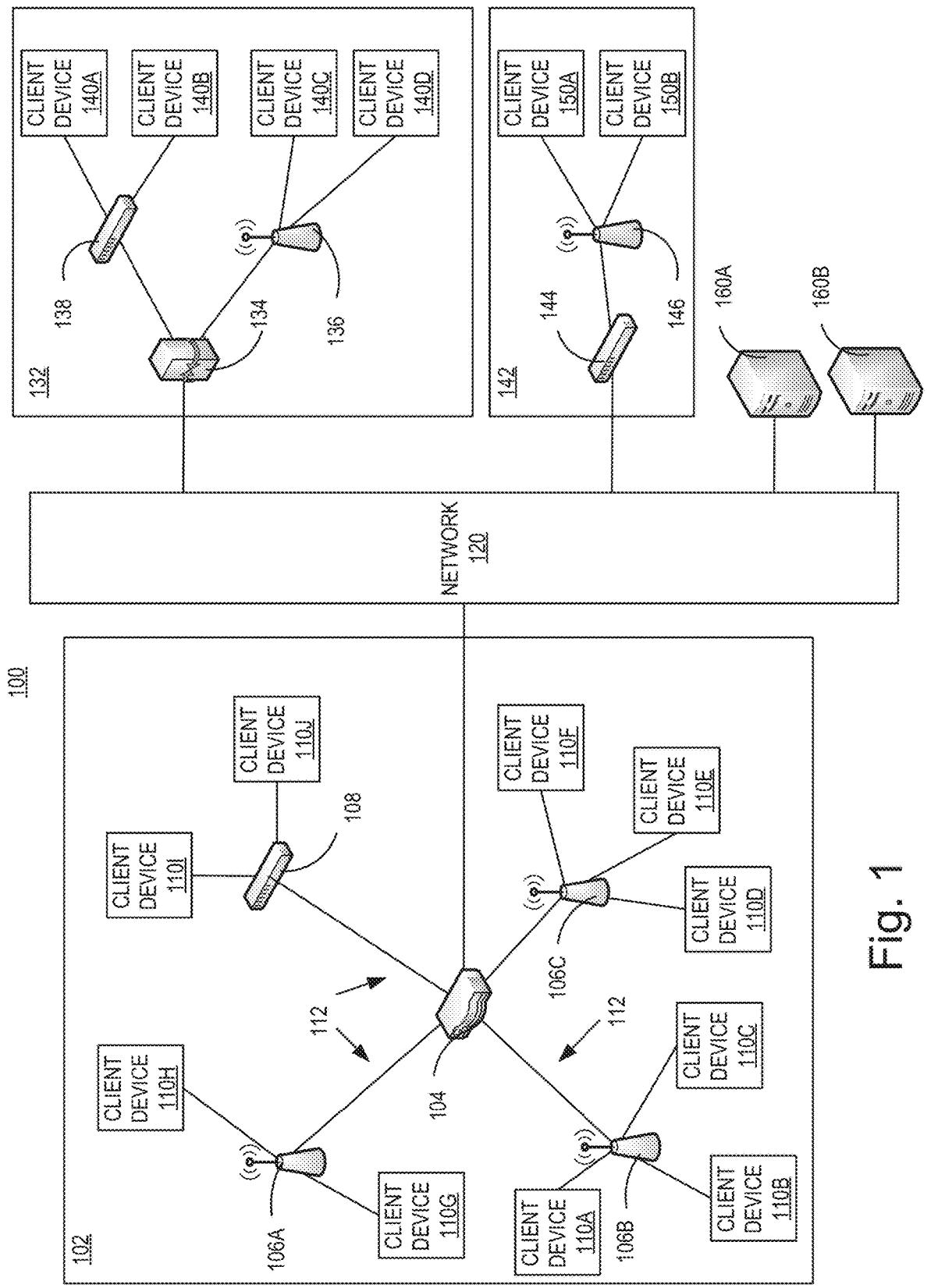
FIG. 1 illustrates an example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Fine Timing Measurement (FTM) may be used by wireless stations (STAs) and wireless access points (AP), to estimate the distance between them. FTM may allow a client device or AP to determine its distance from another AP by measuring the duration of a radio wave transmission time frame traveling back and forth between the client device or AP and the other AP.

In an example, for measuring the distance between a client device and an AP using FTM, the client device may send a ranging request to the AP to initiate an FTM session. In the FTM session, exchange of FTM messages occur between the client device and the AP based on which the distance between them is estimated. The AP receiving the ranging request allocates its computing resources and time slots for handling the FTM message exchanges in the FTM session. As more ranging requests are received by the AP, greater computing resources and time slots of the AP may be consumed which may increase the processing load of the AP for handling the ranging requests and thereby adversely affect traffic handling performance of the AP. Thus, it is necessary to optimally balance the use of AP's resources for FTM and non-FTM functions, such as providing enterprise services, servicing connected stations, delivering high priority traffic, scanning the network, etc. On the other hand, it is also essential to optimally use FTM measurements so that error margins in the measurements may be reduced and precision may be increased.

The IEEE 802.11 standards provide several distinct radio frequency (RF) ranges, such as 2.4 GHz and 5 GHz frequency bands, for use in WLAN communications. Each frequency band is divided into multiple channels. In some examples, the channels may have a channel width of 20 MHz, 40 MHz, 80 MHz, or 160 MHz. Channels with wider channel width may provide a higher throughput. Generally, wireless enterprise deployments use 20 MHz or 40 MHz channel widths for operation, particularly in dense environments which may minimize interference, allow spatial reuse, enhance spectrum efficiency, and reduce adverse impact on neighbour AP's performance. Using channels with 20 MHz or 40 MHz channel widths may also provide greater number of channels and better coverage particularly in dense enterprise deployments. On the other hand, using a higher channel width (such as 80 MHz) enables an optimal FTM accuracy for location-based applications on indoor deployments. In some examples, FTM-based positioning techniques may exhibit less than one-meter precision error for channels with 80 MHz channel widths while they may exhibit higher error margins for channels with lower channel widths (such as 20 MHz or 40 MHz). Therefore, there is a need to optimize FTM accuracy on enterprise APs while having minimal impact on the network performance.

The present disclosure includes techniques of selectively switching/upgrading the channel width of a WLAN channel on which the AP is operating to a higher channel width (such as 80 MHz) for performing an FTM burst. On completion of the FTM burst, the channel width is again switched back to its previous value. Thus, the present disclosure may facilitate executing the FTM bursts in a channel with high channel width, say 80 MHz, thereby achieving high precision in location measurements, while performing the non-FTM functions in the channel with low channel width (20 or 40 MHz) which is optimal for enterprise functions of the AP.

In an example, an AP may receive a ranging request for initiating a an FTM session from a client device. The ranging request refers to a request to initiate the FTM session to determine the distance between the requesting device and the AP. In response to receiving the ranging request, the AP may modify a channel width of a WLAN channel on which the AP is operating. In an example, the WLAN channel in which the AP is configured to perform traffic forwarding and enterprise functions is also referred to as a home channel of the AP. The AP may modify the channel width of the home channel from a first channel width to a second channel width for performing the FTM session, where the second channel width is greater than the first channel width. The first channel width refers to a preconfigured channel width of the WLAN channel in which the AP is operating. In some examples, the first channel width may be 20 MHz or 40 MHz and the second channel width may be 80 MHz. In response to completion of an FTM burst associated with the FTM session, the AP may restore the channel width of the WLAN channel to the first channel width for performing non-FTM operations of the AP.

Thus, in the present disclosure a ranging request is processed and an FTM session may be initiated based on the ranging request, after the channel width is increased, thereby ensuring that exchange of FTM messages occur in a channel having high channel width (such as 80 MHz) consequently facilitating higher precision in FTM-based positioning. Further, restoring the channel width to its previous value once the FTM burst is complete may allow non-FTM operations of the AP to be performed with low channel width, such as 20 MHz or 40 MHz which may facilitate enterprise functions of the AP. Thus, with the present techniques, precise FTM-based positioning may be performed without adversely affecting non-FTM operations of the AP. The present techniques of selectively modifying the channel width may also enable the AP to efficiently use the RF spectrum while using different channel widths for performing FTM and non-FTM functions. Thus, a balanced distribution of the RF spectrum and computing resources of the AP for FTM and non-FTM functions, such as providing enterprise services, servicing connected stations and delivering high priority traffic, scanning the network, etc., may be achieved. Further, in the present techniques, since the channel width of the home channel of the AP is switched to a higher value, the home channel of the AP remains same thereby avoiding unnecessary switching of channels by the AP and preventing loss of air-time or connection loss with associated clients which may have otherwise occurred due to channel switching.

Modifying channel width in response to receiving a ranging request for performing an FTM session and restoring the channel width back to its original value on completion of an FTM burst of the FTM session differs from traditional FTM techniques in several ways. For example, in traditional FTM techniques, the AP receiving the ranging request may initiate the FTM session in a channel having a preconfigured channel width. This traditional system would not modify or switch the channel width before initiating the FTM session. Rather, the AP in the traditional system may attempt to initiate the FTM session in a channel having a preconfigured channel width, such as 20 MHz or 40 MHz for enterprise deployments. This may result in high precision errors in positioning of wireless devices using the traditional FTM techniques.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. The APs 106a-c may control network access of the client devices 110a-h and may authenticate the client devices 110a-h for connecting to the APs and through the APs, to other devices within the network configuration 100. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
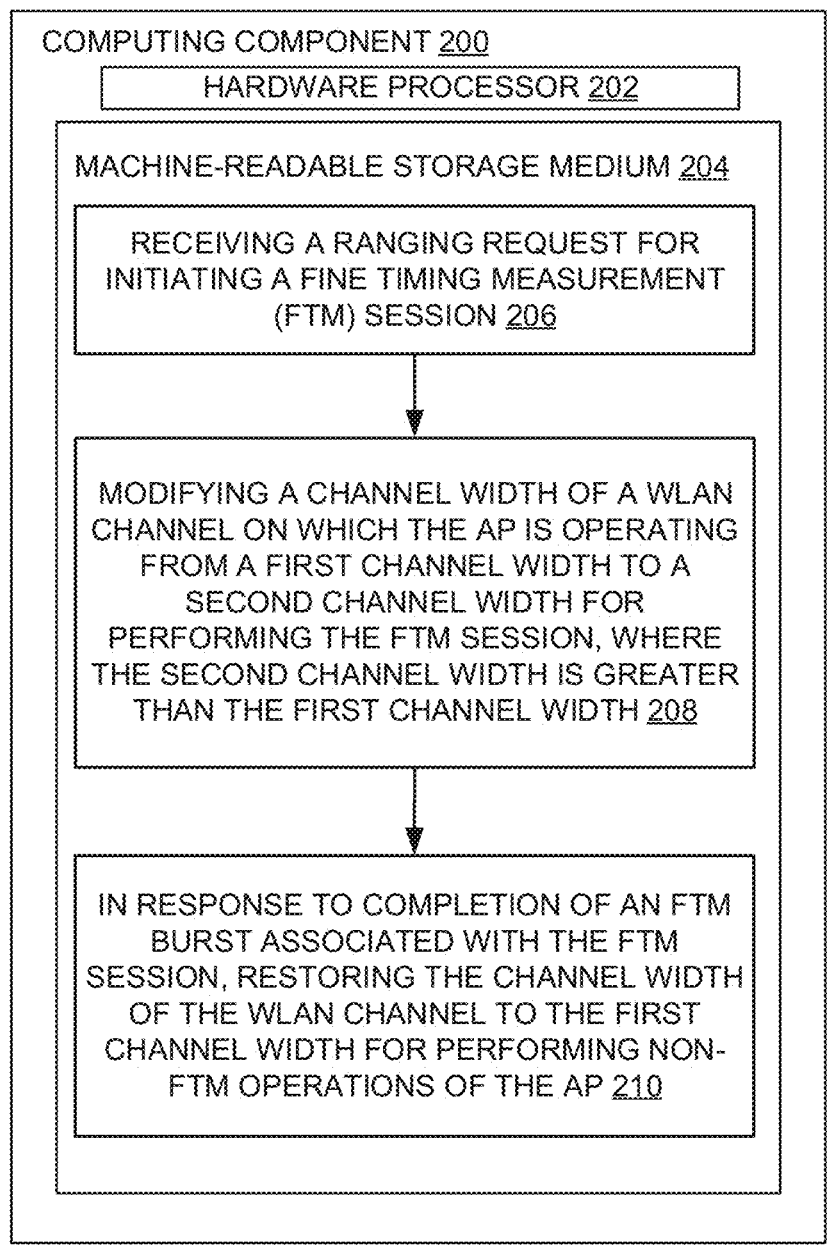
FIG. 2 is a block diagram of an example computing component or device for handling FTM requests in accordance with an embodiment.

FIG. 2 is a block diagram of an example computing component or device 200 for handling FTM requests, in accordance with an embodiment. In an example, the computing component 200 may function as a network device, as referred to in embodiments described herein. Examples of the network device may include APs, layer 3 switches, and routers. In another example, the computing component 200 may function as a client device, such as a computer, a smartphone, etc., connecting to the network device.

In the example implementation of FIG. 2, the computing component 200 includes a hardware processor, 202, and machine-readable storage medium, 204. Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-210, to control processes or operations for handling ranging requests for initiating an FTM session. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-210.

Further, although the steps shown in FIG. 2 are in an order, the shown order is not the only order in which the steps may be performed. Any step may be performed in any order, at any time, may be performed repeatedly, and/or may be performed by any suitable device or devices. The process shown in FIG. 2 is also discussed in FIG. 3, at a differing level of detail.

In step 206, the computing component/device 200 receives a ranging request for initiating an FTM session. The FTM session may include an exchange of multiple message frames between an initiating WLAN station (STA) and a responding STA. In an example, the initiating WLAN station may be an AP or a client device, such as a laptop, desktop, smartphone, etc. The computing component/device 200 may be the responding STA. Examples of the responding STA may include an AP. In an example, a client device may attempt to establish an FTM session with the AP to determine a distance between the client device and the AP. In an example, the client device may be previously connected with the AP receiving the ranging request. Based on the ranging request, the AP may determine a burst duration indicative of a time period for performing the FTM session. The FTM session generally occurs as burst transmissions. Burst transmission is the broadcast of a relatively high-bandwidth transmission over a short period. Burst transmission includes intermittent asynchronous transmission of a specific amount of data. The burst transmission can be intermittent at a regular or an irregular rate. The time duration for executing one FTM session is referred to as the burst duration or simply FTM burst. There may be one or more FTM-based messages exchanged between two WiFi stations in the FTM burst. Although, in the description herein, the ranging request is considered to have originated from a client device, in an example, the ranging request may also originate from another AP.

In step 208, responsive to receiving the ranging request, a channel width of a WLAN channel on which the AP is operating, i.e., the channel width of the home channel, is modified from a first channel width to a second channel width for performing the FTM session. The second channel width is greater than the first channel width. In an example, the second channel width is 80 MHz. In an example, on receiving the ranging request on the home channel, i.e., the WLAN channel on which the AP is operating, the channel width of the home channel is switched to the second channel width. Thus, the AP may initiate the FTM session in the home channel having the second channel width. In an example, the AP may modify the channel width by using the "Format and Bandwidth" field in an FTM response sent by the AP.

In step 210, in response to completion of an FTM burst associated with the FTM session, the channel width of the WLAN channel is restored to the first channel width for performing non-FTM operations of the AP. The non-FTM operations of the AP may include enterprise functions, traffic forwarding, network scanning, etc. In an example, the first channel width may be 20 MHz or 40 MHz.

Figure 3A:
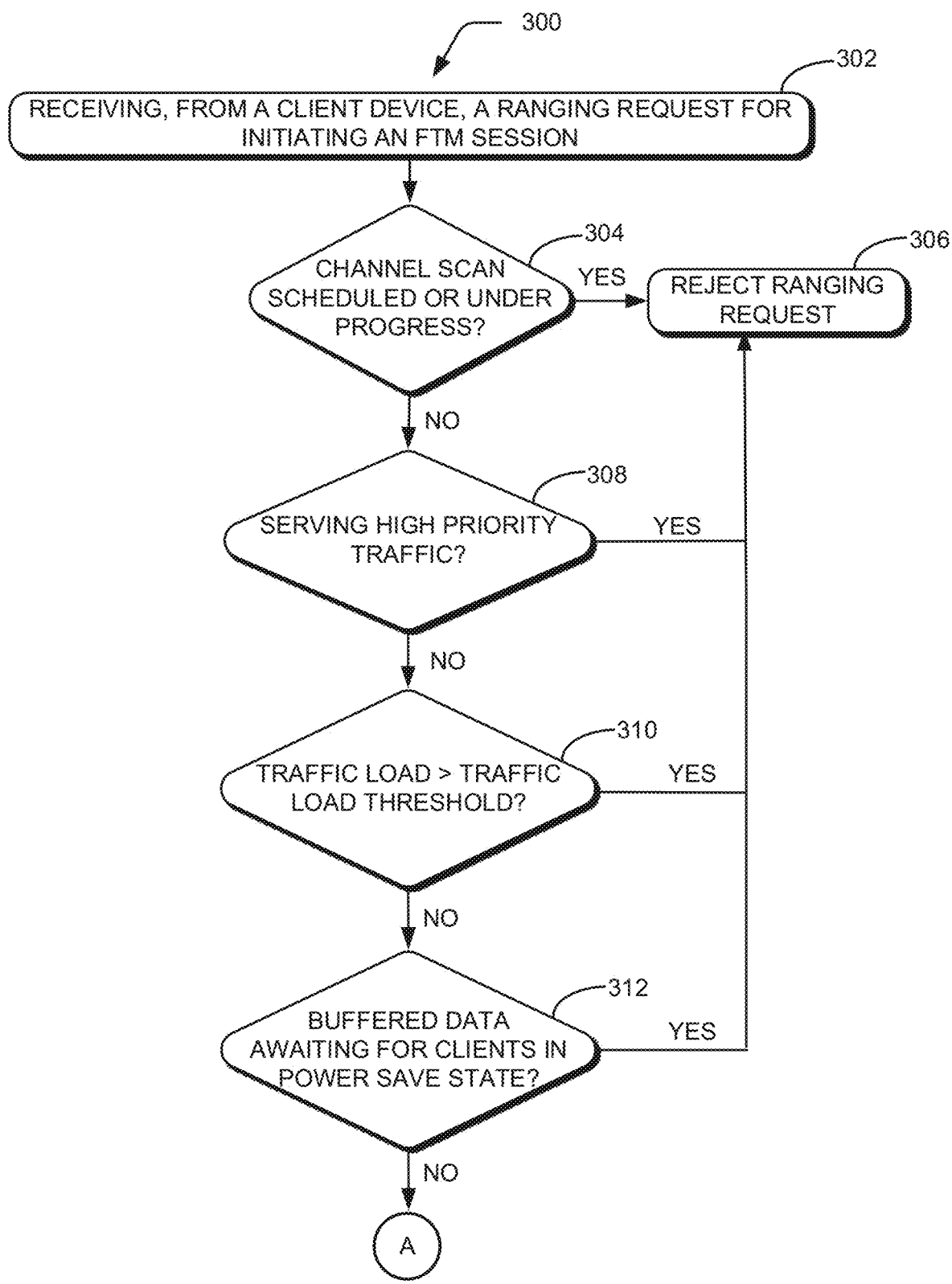
FIGS. 3A and 3B illustrate an example method for handling FTM requests in accordance with an embodiment.
Figure 3B:
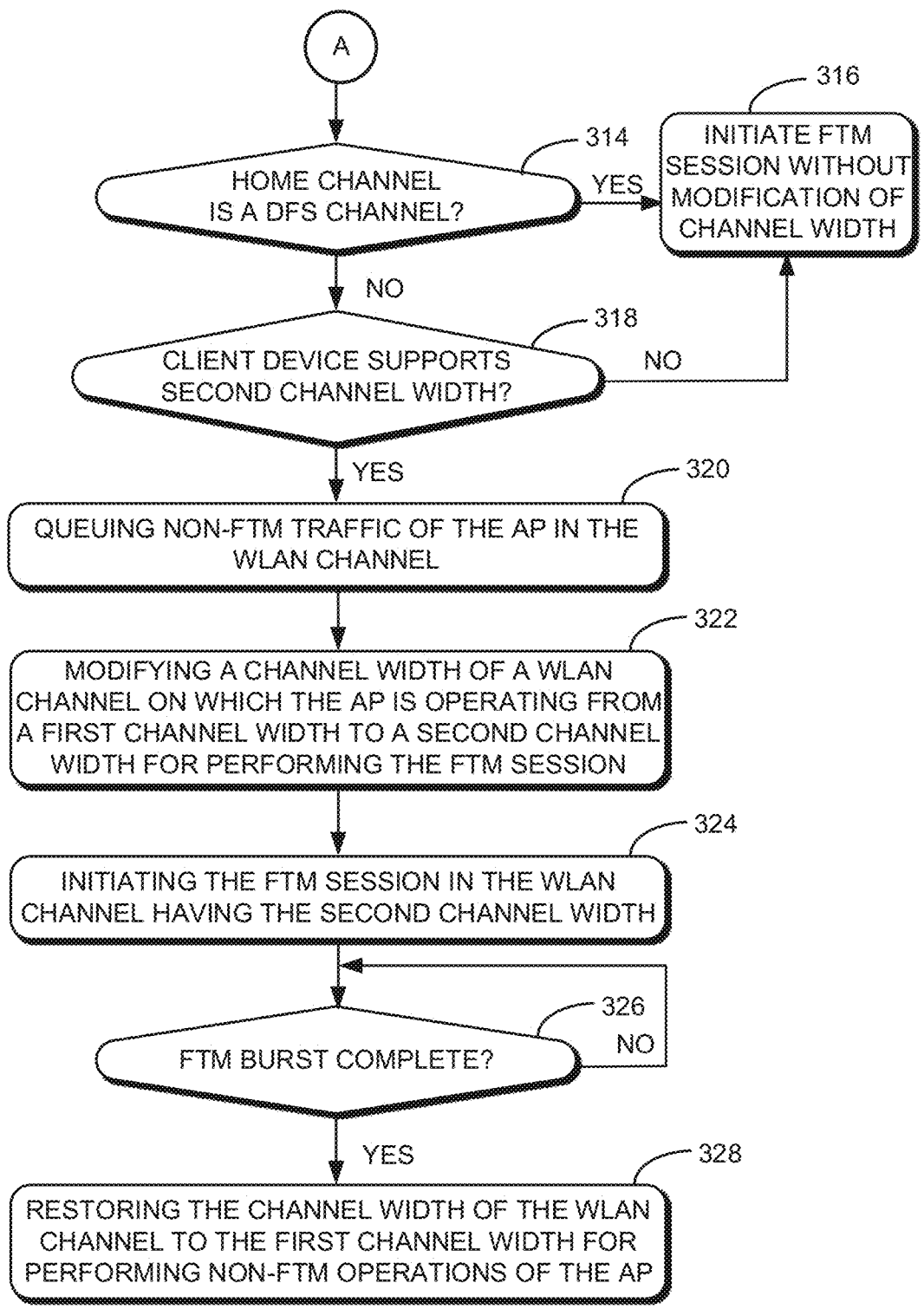

FIGS. 3A and 3B illustrate an example method 300 for handling FTM ranging requests in accordance with an embodiment. The method 300 may be executed by a network device, such as an AP, switch, or router. Although in the examples described herein, it is considered that the method 300 is implemented by a network device, however, the method 300 may also be implemented by client devices, such as personal computers, laptops, smartphones, etc. The steps of the method 300 as described herein can be performed mutatis mutandis by a client device. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as the hardware processor 202, of a computing device/component, such as the computing component 200. Further, although the method 300 is described in context of the aforementioned computing component 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3A, at block 302, an AP, such as one of the APs 106a-c of FIG. 1, may receive a ranging request for initiating an FTM session from a client device, such as one of the client devices 110a-j of FIG. 1. In an example, the AP may be performing non-FTM functions, such traffic forwarding, enterprise operations, etc., on a WLAN channel, say channel 36, in the 5 GHz frequency band, where the operating channel has a channel width of 20 MHz. The channel width of the operating channel may also be referred to as a first channel width. In an example, the client device 110a may send a ranging request to the AP 106a to measure a distance of the client device from the AP 106a. The client device 110a may be associated/connected with the AP 106a. In an example, the ranging request may include an FTM request frame containing FTM parameters to be negotiated with the AP. The FTM parameters may include, for example, a burst duration value, a number of bursts exponent value, a Minimum Delta FTM value, an As Soon As Possible (ASAP) value, FTMs per burst value, FTM frame format, etc. Based on one or more of the FTM parameters included in the ranging request, the FTM burst duration may be determined. In an example, the ranging request may also include a "Format and Bandwidth" field specifying bandwidths supported by the requesting device.

On receiving the ranging request, at block 304, it is checked whether a channel scan is under progress or the AP is scheduled to perform a channel scan. Channel scans may be performed based on channel types, priorities and, channel groups. During channel scanning, the AP may visit each channel sequentially and the primary channel may be rotated after each visit. In an example, while the AP is performing a channel scan and the ranging request is received in a channel which the AP is scanning, the ranging request is rejected, as shown at block 306. In another example, if the AP is scheduled to initiate a channel scan and the ranging request is received in the home channel, the ranging request is rejected, as shown at block 306. By rejecting ranging requests during channel scans, the non-FTM functions of the AP may be prioritized thereby reducing adverse impact on network performance of the AP.

In response to determining that a channel scan is not under progress or not scheduled ("No" branch from block 304), it is checked whether the AP is serving high priority traffic, at block 308. In some examples, the high priority traffic may include voice/video, VoIP traffic, online gaming, media streaming services, etc. In an example, high priority traffic may be classified based on a differentiated services code point (DSCP) present in an Internet Protocol (IP) packet header. In another example, the high priority traffic may be sensitive traffic which the operator has an expectation to deliver on time. Traffic management schemes may be configured in such a way that the quality of service of these selected uses is guaranteed, or at least prioritized over other classes of traffic. In an example, high priority traffic served by the AP is identified. The high priority traffic may be identified based on identifiers present in the packets transmitted via the AP. The AP may classify traffic as high priority based on a number of factors including port number, protocol, byte frequencies, packet sizes. Based on the above factors, an AP may implement traffic management schemes or policies to classify the traffic and serve traffic based on its classification. In some examples, network traffic can be classified as sensitive traffic and best effort traffic. Examples of sensitive traffic may include VoIP, online gaming, video conferencing, and web browsing. Traffic management schemes are configured such that the quality of service (QoS) of these selected uses is guaranteed, or at least prioritized over other classes of traffic. Best effort traffic is all other kinds of non-detrimental traffic. This is traffic that the service provider deems is not sensitive to QoS parameters (such as jitter, packet loss, latency). Examples of best effort traffic may include peer-to-peer and email applications. Traffic management schemes are configured such that resources of the AP are assigned to the best-effort traffic after sensitive traffic is served in priority. Thus, the high priority traffic, in this example, may include sensitive traffic. In an example, network traffic served by the AP may be classified as high priority or best effort using service differentiation techniques. For instance, a DSCP which is a packet header value in an IP packet can be used to request (for example) high priority or best effort delivery for network traffic.

In response to determining that the AP is serving high priority traffic ("YES" branch from block 308), the ranging request is rejected at block 306. By rejecting the ranging request while servicing high priority traffic, high priority traffic handling is given higher priority than servicing of FTM requests thereby balancing distribution of AP's resources for FTM and non-FTM functions. In response to determining that the AP is not serving high priority traffic ("No" branch from block 308), it is checked whether that the traffic load is higher than a traffic load threshold, at block 310. In an example, the traffic load threshold is about 10 Mega Bytes Per Second (MBPS). In response to determining that the traffic load is higher than the traffic load threshold ("YES" branch from block 310), the ranging request is rejected at block 306, thereby preventing processing overload of the AP.

In response to determining that the traffic load is less than or equal to the traffic load threshold ("NO" branch from block 310), it is checked at block 312 whether the AP has buffered data for associated client devices in a power saving (PS) state. The PS state of a client device may indicate a low power mode of the device, where some of the components/ peripherals, such as display units, hard disks, are tuned off and some of the components, such as Random Access Memory (RAM), processing units, etc., are continued to run with reduced power. In an example, the AP may use Traffic Indication Map (TIM) bitmap to indicate to an STA in PS state that the AP has buffered data waiting for it. The AP periodically sends the TIM bitmap in its beacons as an information element. The TIM bitmap includes a multitude of bits, each bit representing an Association ID (AID) of an STA. Thus, a portion of the TIM bitmap representing STAs for which the AP has buffered data is transmitted with the beacons. Using the TIM bitmap sent in a beacon, the AP may determine whether the AP has buffered data waiting to be transmitted to associated client devices in the PS state.

In response to determining that the AP has buffered data for associated client devices in PS state ("YES" branch from block 312), the ranging request is rejected at block 306. In response to determining that the AP has no buffered data for associated client devices in PS state ("No" branch from block 312), at block 314 it is checked whether the WLAN channel on which the AP is operating, i.e., the home channel, is a Dynamic frequency Selection (DFS) channel. DFS refers to a channel allocation scheme which may enable use of WLAN channels which may be generally reserved for radars. Thus, by using DFS channels under-serviced frequencies may be utilized which may increase the number of available channels. DFS also enables an AP to detect radar signals and switch their operating frequency to prevent interference. Since, the DFS channels are generally used for radars, different radio communication regulatory agencies, such as the Federal Communications Commission (FCC), impose several conditions and guidelines for use of the DFS channels. For example, the FCC may require that a Channel Availability check (CAC) is performed before transmitting after a channel change while using DFS channels. Thus, if the home channel of the AP is a DFS channel and channel width of such a channel is modified for performing an FTM session, a CAC is required to be performed before an FTM burst is initiated to comply with FCC guidelines. Thus, the AP may not be able to initiate the FTM burst immediately after modification of the channel width, since it is required to complete a CAC after the channel width modification and before initiating the FTM burst. A time taken by the AP to complete the channel width switch, the CAC, and the FTM burst may be greater than a beacon interval of the AP. Therefore, if the channel width of the DFS channel is modified, then there is a chance that the AP gets busy in performing the CAC and a subsequent FTM burst and consequently misses transmission of a beacon frame. To prevent such a scenario, in response to determining that the AP is operating in a DFS channel ("YES" branch from block 314), at block 316, the FTM session is initiated in the home channel without modification of the channel width.

In response to determining that the AP is not operating in the DFS channel, at block 318, it is checked whether the client device requesting the FTM session supports, i.e., is operable in high channel width, such as the second channel width (say 80 MHz). In an example, the AP may determine whether the client device supports the second channel width based on information in the "Format and Bandwidth" field of the ranging request sent by the client device.

In response to determining that the client device does not support the second channel width ("NO" branch from block 318), the FTM session may be initiated in the channel in which the AP is operating having the first channel width or its preconfigured channel width, at block 316. In response to determining that the client device supports the second channel width, non-FTM traffic, such as video, voice, audio, online media streaming, online gaming, etc., is queued in the AP, at block 320. In an example, the non-FTM traffic may be buffered in a queue in the AP and may be ready for transmission once the home channel is restored back to its previous channel width (i.e. the first channel width).

Once non-FTM traffic is queued in the AP, the channel width of the channel is modified from the first channel width to the second channel width for performing the FTM session, at block 322. The first channel width refers to a preconfigured channel width of the WLAN channel in which the AP is operating. In response to modification of the channel width, the FTM session may be initiated in the channel having the second channel width at block 324, thereby performing the FTM session in the second channel width which is higher than the first channel width and consequently facilitating precise location measurements. At block 326, it is checked whether an FTM burst of the FTM session is completed. On completion of the FTM burst ("Yes" branch from block 326) the channel width of the home channel of the AP is restored back to the first channel width for performing non-FTM operations of the AP, at block 328.

Figure 4:
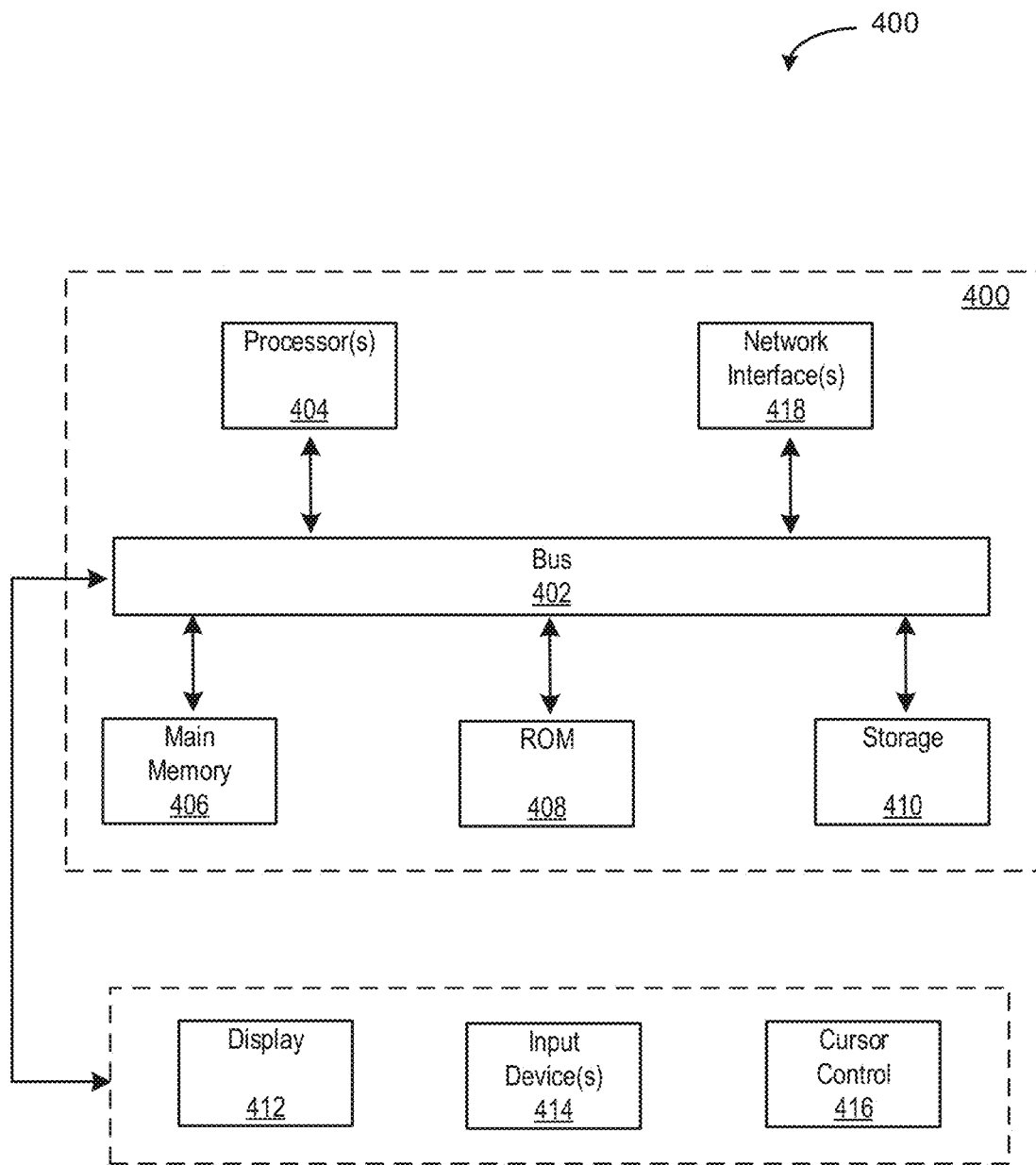
FIG. 4 depicts a block diagram of an example computer system in which the embodiments described herein may be implemented.

FIG. 4 depicts a block diagram of an example computer system 400 in which the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts.

Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418. The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
    receiving, by an access point (AP), a ranging request for initiating a Fine Timing Measurement (FTM) session, the ranging request originating from a client device;
    in response to receiving the ranging request, determining whether a traffic load at the AP is higher than a traffic load threshold;
    in response to determining that the traffic load is higher than the traffic load threshold, rejecting the ranging request;
    modifying, by the AP, a channel width of a Wireless Local Area Network (WLAN) channel on which the AP is operating from a first channel width to a second channel width for performing the FTM session, wherein the second channel width is greater than the first channel width; and
    in response to completion of an FTM burst associated with the FTM session, restoring, by the AP, the channel width of the WLAN channel to the first channel width for performing non-FTM operations of the AP.

2. The method of claim 1, further comprising:
    prior to modifying the channel width, queuing non-FTM traffic in the AP.

3. The method of claim 2, further comprising:
    in response to restoring the channel width, reinitiating transmission of the queued non-FTM traffic in the WLAN channel.

4. The method of claim 1, further comprising:
    in response to modifying the channel width, initiating the FTM session in the WLAN channel having the second channel width.

5. The method of claim 1, further comprising:
in response to receiving the ranging request, determining whether a channel scan of the AP is scheduled or under progress; and
in response to determining that the channel scan is scheduled or under progress, the ranging request is rejected.

6. The method of claim 1, further comprising:
in response to receiving the ranging request, determining whether the AP is serving high priority traffic, wherein the high priority traffic is identified based on at least one of port number, protocol, byte frequencies, packet sizes, and differentiated services code point (DSCP) in an Internet Protocol (IP) packet header; and
in response to determining that the AP is serving high priority traffic, rejecting the ranging request.

7. The method of claim 1, further comprising:
in response to receiving the ranging request, determining, based on Traffic indication map (TIM) information, whether the AP has buffered data for associated client devices in a power saving (PS) state; and
in response to determining that the AP has buffered data for associated client devices in PS state, rejecting the ranging request.

8. The method of claim 1, further comprising:
prior to modifying the channel width,
determining whether the client device is operable in the second channel width; and
in response to determining that the client device is inoperable in the second channel width, initiating the FTM session in the WLAN channel having the first channel width.

9. The method of claim 1, further comprising:
prior to modifying the channel width,
determining that the WLAN channel on which the AP is operating is a dynamic frequency selection (DFS) channel; and
initiating the FTM session based on the ranging request in the WLAN channel having the first channel width.

10. The method of claim 1, wherein the second channel width is 80 Mega Hertz (MHz) and the first channel width is one of 20 MHz and 40 MHz.

11. The method of claim 1, wherein the AP is operating in the 5 GHz frequency band.

12. An access point (AP) comprising:
a processor; and
a memory coupled to the processor, the memory storing instructions executable by the processor to:
receive a ranging request for initiating a Fine Timing Measurement (FTM) session, the ranging request originating from a client device;
in response to receiving the ranging request, determine whether a traffic load at the AP is higher than a traffic load threshold;
in response to determining that the traffic load is higher than the traffic load threshold, reject the ranging request;
modify a channel width of a Wireless Local Area Network (WLAN) channel on which the AP is operating from a first channel width to a second channel width for performing the FTM session, wherein the second channel width is greater than the first channel width; and
in response to completion of an FTM burst associated with the FTM session, restore the channel width of the WLAN channel to the first channel width for performing non-FTM operations of the AP.

13. The AP of claim 12, wherein the processor is further to queue non-FTM traffic of the AP in the WLAN channel, prior to modifying the channel width.

14. The AP of claim 13, further comprising:
in response to restoring the channel width, reinitiate transmission of the queued non-FTM traffic in the WLAN channel.

15. The AP of claim 12, wherein the processor is further to initiate the FTM session in the WLAN channel having the second channel width, in response to modifying the channel width.

16. The AP of claim 12, wherein the processor is further to:
in response to receiving the ranging request, determine whether a channel scan of the AP is scheduled or under progress; and
in response to determining that the channel scan is scheduled or under progress, reject the ranging request.

17. The AP of claim 12, wherein the processor is further to:
in response to receiving the ranging request, determine whether the AP is serving high priority traffic, wherein the high priority traffic is identified based on at least one of port number, protocol, byte frequencies, packet sizes, and differentiated services code point (DSCP) in an Internet Protocol (IP) packet header; and
in response to determining that the AP is serving high priority traffic, reject the ranging request.

18. A non-transitory computer-readable medium comprising computer-readable instructions, the computer-readable instructions when executed by a processor, cause the processor to:
receive a ranging request for initiating a Fine Timing Measurement (FTM) session, the ranging request originating from a client device;
in response to receiving the ranging request, determine whether a traffic load at the AP is higher than a traffic load threshold;
in response to determining that the traffic load is higher than the traffic load threshold, reject the ranging request;
modify a channel width of a Wireless Local Area Network (WLAN) channel on which the AP is operating from a first channel width to a second channel width for performing the FTM session, wherein the second channel width is greater than the first channel width; and
in response to completion of an FTM burst associated with the FTM session, restore the channel width of the WLAN channel to the first channel width for performing non-FTM operations of the AP.

19. The non-transitory computer-readable medium of claim 18, wherein the computer-readable instructions further cause the processor to queue non-FTM traffic of the AP in the WLAN channel, prior to modifying the channel width.

* * * * *